(12) United States Patent
Fang et al.

(10) Patent No.: US 12,130,401 B1
(45) Date of Patent: Oct. 29, 2024

(54) LANDSLIDE HAZARD MONITORING AND EARLY WARNING METHOD AND SYSTEM BASED ON REAL 3D

(71) Applicant: Hunan University of Science and Technology, Xiangtan (CN)

(72) Inventors: Jun Fang, Xiangtan (CN); Runlin Zhang, Xiangtan (CN); Wei Liang, Xiangtan (CN); Yongshun Han, Xiangtan (CN); Baiyan Wu, Xiangtan (CN); Wentao Yang, Xiangtan (CN)

(73) Assignee: Hunan University of Science and Technology (CN)

( * ) Notice: Subject to any disclaimer, the term of this patent is extended or adjusted under 35 U.S.C. 154(b) by 0 days.

(21) Appl. No.: 18/531,737

(22) Filed: Dec. 7, 2023

(30) Foreign Application Priority Data

Jun. 28, 2023 (CN) .......................... 202310768265.5

(51) Int. Cl.
*G01V 20/00* (2024.01)
*G08B 21/10* (2006.01)

(52) U.S. Cl.
CPC .............. *G01V 20/00* (2024.01); *G08B 21/10* (2013.01)

(58) Field of Classification Search
CPC ........ G01V 20/00; G08B 21/10; G06V 20/13; G06V 20/17; Y02A 50/00
See application file for complete search history.

(56) References Cited

U.S. PATENT DOCUMENTS

2013/0132045 A1  5/2013  Mello et al.
2022/0383475 A1  12/2022  Dai et al.

FOREIGN PATENT DOCUMENTS

| CN | 106226779 A | 12/2016 |
| CN | 110866973 A | 3/2020 |
| CN | 112198511 A | 1/2021 |
| CN | 112669571 A | 4/2021 |
| CN | 113487123 A | 10/2021 |

(Continued)

OTHER PUBLICATIONS

Machine translation of CN 115014432 A to Zhang et al. published Sep. 6, 2022.*

(Continued)

*Primary Examiner* — Manuel L Barbee (57) ABSTRACT

A landslide risk monitoring and early warning method based on real 3D includes the following steps: S1, multi-source data fusion processing: collecting landslide-related data for an integrated fusion processing; S2, large-scale scene modeling, and analysis; S3, mesoscale scene modeling and analysis; S4, small-scale scene modeling and analysis; S5, landslide knowledge association and entity database construction; S6, landslide risk multi-scale dynamic assessment; S7, landslide multi-indicator monitoring and early warning. A landslide hazard monitoring and early warning system based on real 3D is also disclosed. The above-mentioned landslide risk monitoring and early warning method and system based on real 3D can realize different scale data acquisition and real 3D modeling of landslide geological disasters, establishment of full-factor real 3D landslide scene database, multi-scale spatial-temporal dynamic monitoring and analysis of landslide risk, and timely and intelligent multi-indicator early warning.

4 Claims, 10 Drawing Sheets

(56) References Cited

FOREIGN PATENT DOCUMENTS

| CN | 113885025 A | | 1/2022 |
|---|---|---|---|
| CN | 114359500 A | * | 4/2022 |
| CN | 115014432 A | * | 9/2022 |

OTHER PUBLICATIONS

Machine translation of CN 114359500 A to Ye et al. published Apr. 15, 2022.*

Li Yongbo, et al., Research on the application of flood model based on data fusion, Electric Measurement Technology, 2021, pp. 92-97, vol. 44 No. 1.

Xu Qiang, et al., Landslide Collaborative Observation Technology Based on Real Scene 3D View from Space-Air- Ground-Interior Perspective, Journal of Engineering Geology, 2023, pp. 706-717, vol. 31 No.3.

Hao Haojie, et al., A Fast Matching Algorithm for Remote Sensing Images of UAV Landslide, Geomatics World, 2020, pp. 83-89, vol. 27 No.4.

* cited by examiner

LANDSLIDE HAZARD MONITORING AND EARLY WARNING METHOD AND SYSTEM BASED ON REAL 3D

CROSS REFERENCE TO THE RELATED APPLICATIONS

This application is based upon and claims priority to Chinese Patent Application No. 202310768265.5, filed on Jun. 28, 2023, the entire contents of which are incorporated herein by reference.

TECHNICAL FIELD

The invention relates to the field of landslide monitoring and early warning technology, in particular to a landslide hazard monitoring and early warning method and system based on real 3D.

BACKGROUND

A landslide disaster is a kind of complex and changeable disaster, that is widely distributed and frequently occurs with great destruction. Therefore, it is of great significance to scientifically analyze and study the risk monitoring and early warning of landslide disasters. It is of certain complexity and difficulty to realize the prior identification, scientific monitoring, and accurate early warning method of landslide disasters. In the early stage, there were many visual modeling analyses and calculation methods for numerical simulation and simulation of landslides. However, the expression of the disaster process of the landslide is not intuitive, and it cannot show its real characteristics in space.

With the development and application of satellite remote sensing, navigation, and positioning, geographic information technology, the use of satellite images, aerial images, laser radar, and other technologies to generate digital orthophoto map (DOM), digital surface model (DSM) and digital elevation model (DEM) to visualize landslides is becoming more and more popular, the two-dimensional mapping expression based on remote sensing images is not intuitive enough, and the 3D surface model has the problems of serious occlusion, tensile deformation and low accuracy. The acquisition cost of laser radar equipment is high, and the laser point cloud data is not enough to analyze the depth only as an auxiliary means. The traditional manual modeling method using 3DSMax, Skyline, Sketch Up, and other traditional 3D modeling software has the disadvantages of large workload, high production cost, and low efficiency, those methods are only suitable for regular structural entities and have insufficient applicability to irregular landslide bodies. Nowadays, UAV-based close-range photogrammetry and oblique photogrammetry technology are widely used in landslide disaster prevention and control. However, data collection is greatly affected by topography, geomorphology, vegetation, etc., and the collection workload is large in complex environments. The data quality is unstable, and the reconstruction of physical details is insufficient, it is difficult to carry out accurate quantitative analysis and 3D visualization analysis, and it is difficult to carry out accurate quantitative analysis and 3D visualization analysis.

The current disaster early warning is mostly subjectively judged by knowledge and experience, the single indicator threshold is commonly used for prediction and early warning based on historical statistical methods and models. Due to the lack of consideration of the multi-indicator coupling mechanism, the spatial and temporal correlation and dynamic process analysis are insufficient, as a result, the generalization ability of risk monitoring and early warning of major landslide disasters is insufficient, which directly affects the accuracy and reliability of the analysis results.

Through the above analysis of the background and current situation, it is not difficult to see that there is a lack of a method for fine and realistic multi-scale 3D reconstruction of complex landslide scenes, which supports the analysis of single, entity, and semantic features of landslide scenes and realizes the multi-indicator accurate early warning of landslide disasters considering the correlation of spatio-temporal dynamic processes.

SUMMARY

The purpose of the invention is to provide a landslide hazard monitoring and early warning method and system based on real 3D to solve the problems raised by the above background technology.

In order to achieve the above purpose, the invention provides a landslide hazard monitoring and early warning method based on real 3D, comprising the following steps:

S1, multi-source data fusion processing: collecting landslide-related data for an integrated fusion processing.

S2, large-scale scene modeling and analysis: S21, image selection and preprocessing; S22, image sparse matching; S23, regional network adjustment; S24, generating a point cloud by dense matching; S25, triangulation network construction; S26, texture mapping; S27, terrain-level Mesh model; S28, feature census.

S3, mesoscale scene modeling and analysis: S31, mesoscale data acquisition and processing; S32, point cloud fusion; S33, model reconstruction; S34, detailed investigation of characteristics.

S4, small-scale scene modeling and analysis: S41, data analysis; S42, monomer reconstruction; S43, model refinement; S44, texture mapping; S45, data derivation; S46, monomer characteristics analysis.

S5, landslide knowledge association and entity database construction.

S6, landslide risk multi-scale dynamic assessment.

S7, landslide multi-indicator monitoring, and early warning.

Preferably, in S1, collecting multi-source data such as basic geographic information data, satellite remote sensing images, UAV images, laser point cloud data, geological environment data, historical disaster data, disaster professional monitoring data, video surveillance data, manual inspection report data and other data related to landslides for the integrated fusion processing; performing digitization and format conversion for heterogeneous data, unifying data benchmarks and coordinate projections, completing an image splicing and a data registration, realizing a synchronous matching of static geospatial data and dynamic internet of things perception data, and constructing a 'one map' of real 3D landslide data.

Preferably, in S2, large-scale scene modeling and analysis: using satellite remote sensing data or UAV image data combined with geological environment census data to carry out a global scope of landslide census, and completing a rapid reconstruction of large-scale landslide scene with a resolution accuracy from meters to centimeters, analyzing and extracting relevant characteristics and parameters of large-scale scene landslide; S21, image selection and preprocessing: selecting high-resolution satellite images and drone images with high imaging quality, no cloud influence, and consistent hues, performing image preprocessing steps such as cloud removal, uniform light and uniform color, distortion correction, and mosaic enhancement as required to improve the quality and accuracy of the images; S22, image sparse matching: extracting robust feature points from stereo image pairs or multi-view images, and establishing a correspondence between corresponding feature points; identifying an image content with the same or similar structure in two or more images and establishing an accurate mapping relationship; S23, regional network adjustment: carrying out an aerial triangulation by using internal and external orientation elements and POS information of each image, and taking homonymous points between the images as connection points to construct a self-calibration regional network adjustment error equation, so as to obtain accurate internal and external orientation elements and 3D coordinates of the connection points; S24, generating a point cloud by dense matching: performing a dense matching of homonymous image points of each pixel by using an accurate relative position relationship between images, and performing a front intersection to obtain a 3D point cloud on a surface of a ground object; S25, triangulation network construction: constructing a triangulation network (TIN) to obtain a continuous triangulation surface model (Mesh white model) based on the 3D point cloud of dense surface; S26, texture mapping: performing an automatic texture mapping for the white mold according to a geometric relationship between an object side and an image side; S27, terrain level Mesh model: forming a set of continuous real scene 3D models of global large-scale; S28, feature census: using a large-scale real 3D model to delineate the range of meter-level and centimeter-level disasters, and the general census of the characteristics of the surrounding topography, vegetation, ground objects, and disaster-inducing environment.

In S3, using an UAV close-range image and laser point cloud data to carry out a detailed investigation of a disaster, and completing a real 3D modeling of a mesoscale landslide (resolution accuracy reaches a meter level), and analyzing and extracting characteristics and parameters of a landslide body; S31, mesoscale data acquisition and processing: using an UAV close photogrammetry technology for potential disaster areas to collect multi-angle millimeter-level spatial resolution close-range images for disasters, generating a dense point cloud after an aerial triangulation calculation and dense matching, under complex conditions such as vegetation occlusion and insufficient light, collecting millimeter-level point cloud data by a high-precision 3D laser scanner, separating ground points and non-ground points under vegetation coverage after point cloud denoising and filtering; S32, point cloud fusion: implementing an UAV image dense point cloud and a preprocessed 3D laser point cloud for registration, evaluation and fusion; S33, model reconstruction: reconstructing the complete point cloud after fusion by triangulation, carrying out a texture mapping and a model mapping to generate a high-precision mesoscale Mesh model; S34, detailed investigation of characteristics: based on the mesoscale real 3D landslide model, performing a millimeter level extraction and analysis for the development characteristics, disaster mechanism and disaster-causing factors of landslide disaster.

Preferably, in S4, performing a monomer subdivision for the real 3D model, and completing a component-level reconstruction of a ground-related feature frame structure and an underground landslide stratum structure, analyzing and extracting high-precision detailed features and parameters; S41, data analysis: integrating landslide data such as 3D Mesh model, laser point cloud, texture photos and borehole geological data, unifying data benchmark, and analyzing landslide-related entity subdivision structure and rock and soil properties; S42, monomer reconstruction: constructing a landslide subdivision model and a 3D stratum model respectively; S43, model refinement: improving a reconstructed landslide structure and a 3D model of a geological body through cutting, repairing, hole filling and other methods; S44, texture mapping: improving and repairing the texture of detail parts, completing a surface texture mapping of the model; S45, data derivation: completing a monomer complement of ground object entities and a topological hierarchy construction of geographic units through a two-dimensional vector or other 3D data acquisition or derivation; S46, monomer characteristics analysis: extracting 3D fine feature information of each monomer model in the landslide scene.

In S5, extracting a knowledge ontology by integrating the real 3D landslide model, geological environment data, and historical disaster data, attributes are improved by means of supplement and connection, and analyzing the spatial, class, time, and semantic relationships of multi-scale entities; unifying an entity coding and assignment, and constructing a knowledge map of landslide scene, after a standardized data quality inspection, integrating the data by requirements to establish a real 3D database of landslide scene.

In S6, constructing a multi-scale spatio-temporal dynamic assessment model of landslide risk in read 3D based on a full-factor real 3D landslide scene database, carrying out a risk assessment, a susceptibility assessment and a vulnerability assessment from different scales of large, medium and small, combined with a 3D spatio-temporal process of landslide evolution, dynamically analyzing a disaster-inducing environment, disaster-causing factors and disaster-bearing bodies of the landslide, and extracting key indicators of emergency monitoring of landslide geological disasters and their critical thresholds of the disaster-causing factors such as rock and soil, rainfall and deformation under a coupling action.

Preferably, in S7, constructing a multi-indicator landslide disaster monitoring and early warning algorithm with priority to basic geological conditions, priority to characteristic rainfall, and priority to disaster deformation, and establishing a knowledge-guided landslide monitoring and early warning spatio-temporal evolution model based on artificial intelligence, repeatedly training and optimizing the algorithm after experimental simulation and field testing and improving the early warning mechanism, providing a timely and accurate real-time 3D landslide risk monitoring and early warning services.

The invention also provides a landslide hazard monitoring and early warning system based on 3D,
  comprising a multi-source data integration management module: collecting landslide-related basic geographic information data, satellite remote sensing images, UAV images, laser point cloud data, geological environment data, historical geological disaster data, disaster professional monitoring data, monitoring video data, manual inspection report data and other data and other multi-source data for the integrated fusion processing;
  a large-scale scene modeling and analysis: using satellite remote sensing data or UAV image data combined with geological environment census data to carry out the global scope of landslide census, and completing the rapid reconstruction of large-scale landslide scenes with the resolution accuracy from meters to centimeters, analyzing and extracting relevant characteristics and parameters of large-scale scene landslide;

a mesoscale scene modeling and analysis module: using the UAV close-range image and laser point cloud data to carry out the detailed investigation of the disaster, and completing a real 3D modeling of the mesoscale landslide (resolution accuracy reaches a meter level), and analyzing and extracting characteristics and parameters of a landslide body;

a small-scale scene modeling and analysis module: performing a monomer subdivision for the real 3D model, completing the component-level reconstruction of the ground-related feature frame structure and an underground landslide stratum structure, and extracting high-precision detailed features and parameters;

a landslide knowledge association and entity database construction module: extracting the knowledge ontology by integrating the real 3D landslide model, geological environment data and historical disaster data, attributes are improved by means of supplement and connection, and analyzing the spatial, class, time and semantic relationships of multi-scale entities; unifying an entity coding and assignment, and constructing a knowledge map of landslide scene, after a standardized data quality inspection, integrating the data by requirements to establish a real 3D database of landslide scene;

a multi-scale landslide risk dynamic assessment module: based on a full-factor real 3D landslide scene database, realizing the risk assessment, the susceptibility assessment, and the vulnerability assessment from different scales of large, medium, and small, combined with the 3D spatio-temporal process of landslide evolution, dynamically analyzing the disaster-inducing environment, disaster-causing factors and disaster-bearing bodies of the landslide, and extracting key indicators of emergency monitoring of landslide geological disasters and their critical thresholds of the disaster-causing factors such as rock and soil, rainfall and deformation under a coupling action;

a landslide multi-indicator monitoring and early warning module: realizing a multi-indicator landslide disaster monitoring and early warning algorithm with priority to basic geological conditions, priority to characteristic rainfall, and priority to disaster deformation etc., and establishing a landslide monitoring and early warning spatio-temporal evolution model based on artificial intelligence, repeatedly training and optimizing the algorithm after experimental simulation and field testing and improving the early warning mechanism, and making sure that the system can timely and accurately detect landslide safety hazards and carry out early warnings;

a real 3D scene display module: using a high-tech computer rendering engine to realize a 2D and 3D integrated visualization display of landslide disaster, comprising a basic operation of view, layer management, measurement, plotting, roaming, recording tools, etc.;

a system management and maintenance module: comprising system configuration, user management, rights management, database parameters, and other functions.

Therefore, the invention adopts the above-mentioned landslide hazard monitoring and early warning method and system based on real 3D, which has the following beneficial effects:

(1) The method and system in the invention can realize the data acquisition of different scales of landslide disasters and the 3D modeling of real scenes and can establish a more refined 3D scene to truly express landslide entities and related elements from various aspects, and then it solves the problems of low visualization degree, unintuitive expression of landslide in the existing technology, and low accuracy and drawing deformation in conventional oblique photogrammetry 3D modeling.

(2) The method and system in the invention can establish a ground and underground all-round fine real 3D scene of landslide disaster, and realize the monomerization, substantiation, and semanticization of landslide and related features, the subdivision, attribute and spatial association query, 3D space analysis and millimeter-level feature extraction of the ground and underground structure of the landslide body can be realized based on the 3D scene, it provides a high-precision feature criterion for landslide hazard warning.

(3) The method and system in this invention can take into account the complex landslide monitoring and early warning scenarios of static and dynamic, single factor and multi-indicator, time-spatial and process, through multiple test simulations and field tests, the artificial intelligence algorithm is repeatedly trained and optimized, and the early warning mechanism is gradually revised, so that the system can intelligently and accurately identify landslide safety hazards and timely carry out dynamic early warning.

The following is a further detailed description of the technical solution of the invention through the drawings and an embodiment.

DETAILED DESCRIPTION OF THE EMBODIMENTS

The following is a further explanation of the technical solution of the invention through drawings and an embodiment.

Unless otherwise defined, the technical terms or scientific terms used in the invention should be understood by people with general skills in the field to which the invention belongs. The words 'first', 'second', and the like used in this invention do not represent any order, quantity, or importance, but are only used to distinguish different components. Similar words such as 'include' or 'comprise' mean that the elements or objects appearing before the word cover the elements or objects listed after the word and their equivalents, without excluding other elements or objects. The terms 'setup', 'installation', and 'connection' should be understood in a broad sense, for example, they can be fixed connections, detachable connections, or integrated connections; they can be mechanical connections or electrical connections; it can be directly connected or indirectly connected through an intermediate medium, which can be the internal connection of two components. 'Up', 'down', 'left', 'right', etc. are only used to represent the relative positional relationship, when the absolute position of the described object changes, the relative positional relationship may also change accordingly.

Embodiment

Figure 1:
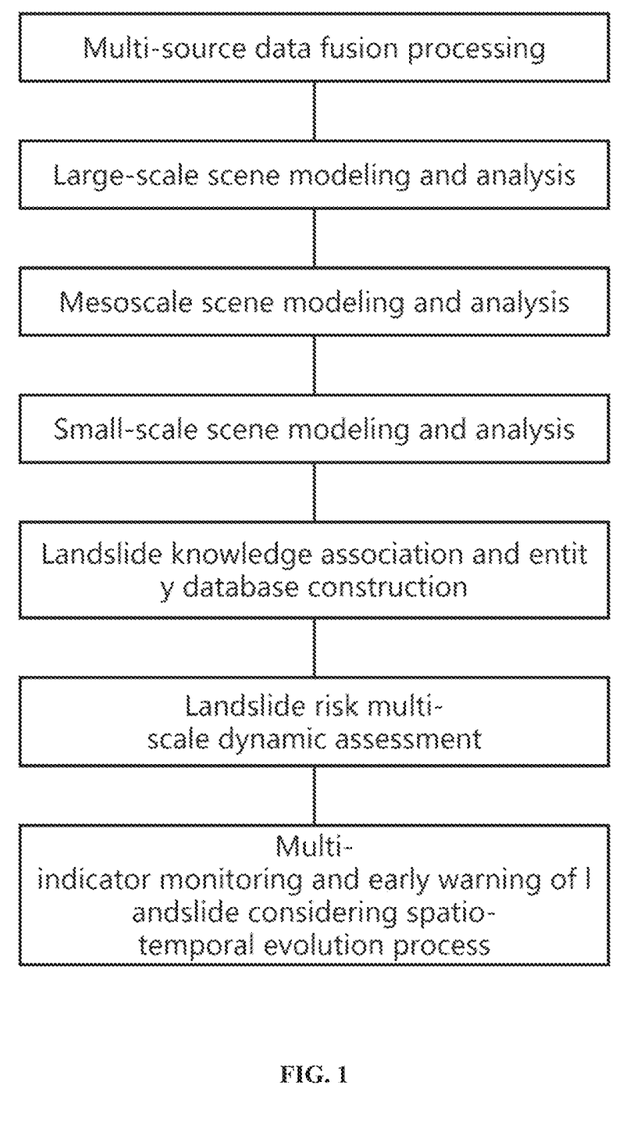
FIG. 1 is a method flow diagram in the embodiment of a landslide hazard monitoring and early warning method based on real 3D.
Figure 2:
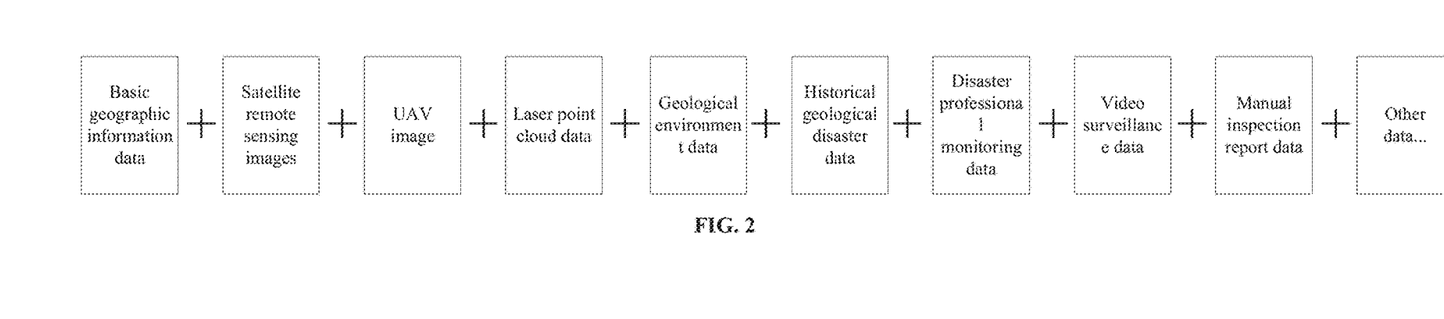
FIG. 2 is a flow chart of multi-source data fusion processing in the embodiment of the invention.

As shown in FIG. 1, the landslide hazard monitoring and early warning method based on real 3D described in this invention comprises the following steps;

FIG. 2 is a flow chart of multi-source data fusion processing in the embodiment of the invention. S1, multi-source data fusion processing: collecting landslide-related data for an integrated fusion processing. The basic geographic information data, satellite remote sensing images, UAV images, laser point cloud data, geological environment data, historical disaster data, disaster professional monitoring data, video surveillance data, manual inspection report data, and other data related to landslides are collected for the integrated fusion processing; digitization and format conversion for heterogeneous data are performed, data benchmarks and coordinate projections are unified, completing the image splicing and the data registration are completed, the synchronous matching of static geospatial data and dynamic internet of things perception data is realized, and the 'one map' of real 3D landslide data is constructed.

Figure 3:
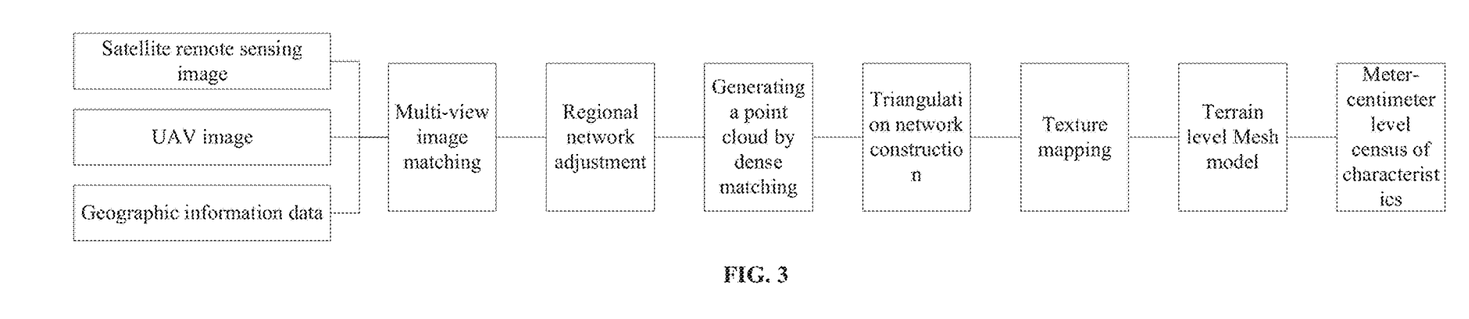
FIG. 3 is a flow chart of large-scale scene modeling and analysis in the embodiment of the invention.

FIG. 3 is the flow chart of large-scale scene modeling and analysis for the embodiment of the invention. S2, large-scale scene modeling and analysis: The satellite remote sensing data or UAV image data combined with geological environment census data are used to carry out the global scope of landslide census, and the rapid reconstruction of large-scale landslide scene with the resolution accuracy from meters to centimeters is completed, and the relevant characteristics and parameters of large-scale scene landslide are analyzed and extracted; S21, image selection, and preprocessing: High-resolution satellite images and drone images with high imaging quality, no cloud influence, and consistent hues are selected, image preprocessing steps such as cloud removal, uniform light and uniform color, distortion correction, and mosaic enhancement are performed as required to improve the quality and accuracy of the images.

S22, image sparse matching: The robust feature points are extracted from stereo image pairs or multi-view images, and the correspondence between corresponding feature points is established; the image content with the same or similar structure in two or more images is identified and the accurate mapping relationship is established.

S23, regional network adjustment: The aerial triangulation is carried out by using internal and external orientation elements and pose measurement information (POS information) of each image, and the homonymous points between the images are taken as connection points to construct the self-calibration regional network adjustment error equation, so as to obtain accurate internal and external orientation elements and 3D coordinates of the connection points.

S24, generating a point cloud by dense matching: The dense matching of homonymous image points of each pixel is performed by using the accurate relative position relationship between images, and the front intersection is performed to obtain the 3D point cloud on the surface of the ground object.

S25, triangulation network construction: The triangulation network (TIN) is constructed to obtain the continuous triangulation surface model (Mesh white model) based on the 3D point cloud of the dense surface.

S26, texture mapping: The automatic texture mapping for the white mold is performed according to the geometric relationship between the object side and the image side.

S27, terrain level Mesh model: A set of continuous real scene 3D models of global large-scale is formed.

S28, feature census: A large-scale real 3D model is used to delineate the range of meter-level and centimeter-level disasters, and the general census of the characteristics of the surrounding topography, vegetation, ground objects, and disaster-inducing environment.

Figure 9:
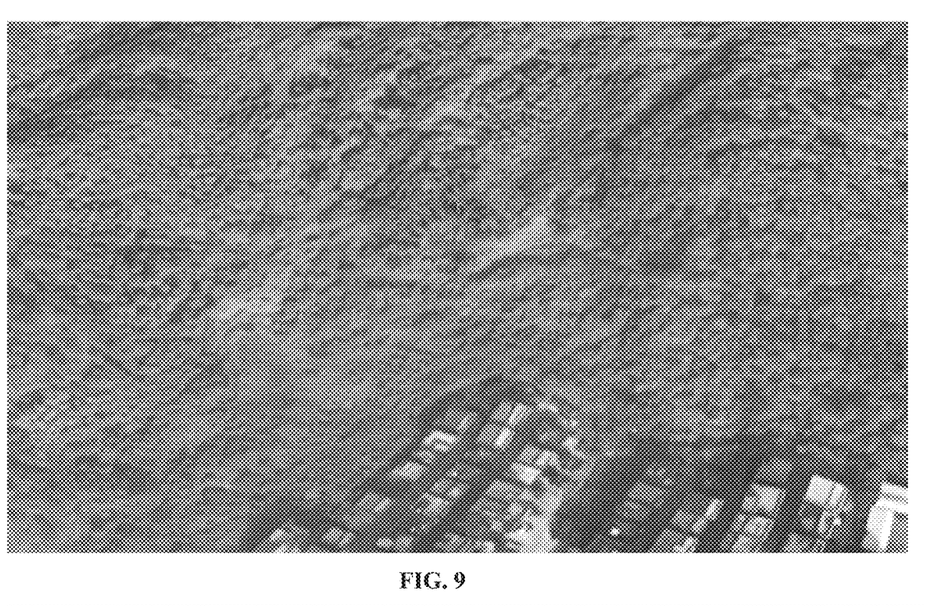
FIG. 9 is a large-scale real 3D landslide effect diagram in the embodiment of the invention.

FIG. 9 is a large-scale real 3D landslide effect diagram in the embodiment of the invention.

Figure 4:
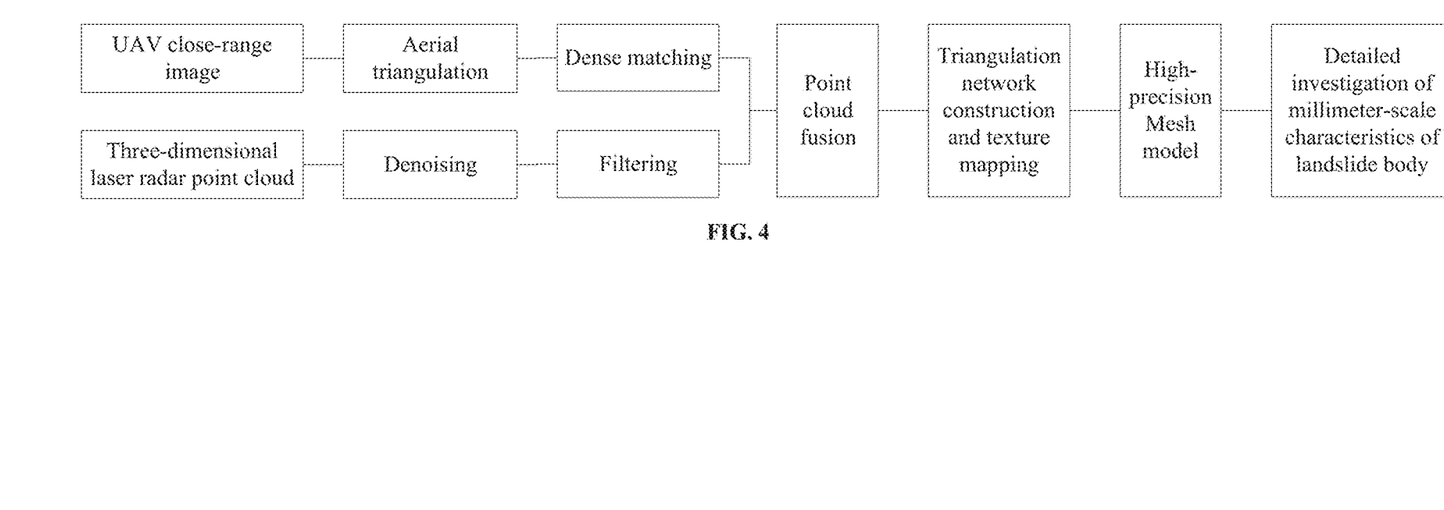
FIG. 4 is a flow chart of mesoscale scene modeling and analysis in the embodiment of the invention.

FIG. 4 is a flow chart of mesoscale scene modeling and analysis in the embodiment of the invention. S3, mesoscale scene modeling, and analysis: The UAV close-range image and laser point cloud data are used to carry out the detailed investigation of the disaster, and the real 3D modeling of a mesoscale landslide is completed (resolution accuracy reaches a meter level), characteristics and parameters of the landslide body are analyzed and extracted;

S31, mesoscale data acquisition and processing: The UAV close photogrammetry technology is used for potential disaster areas to collect multi-angle millimeter-level spatial resolution close-range images for disasters, the dense point cloud after the aerial triangulation calculation and dense matching is generated, under complex conditions such as vegetation occlusion and insufficient light, millimeter-level point cloud data is collected by the high-precision 3D laser scanner, the ground points and non-ground points under vegetation coverage are separated after point cloud denoising and filtering;

S32, point cloud fusion: The UAV image dense point cloud and the preprocessed 3D laser point cloud are implemented for registration, evaluation, and fusion;

S33, model reconstruction: The complete point cloud after fusion is reconstructed by triangulation, the texture mapping, and a model mapping are carried out to generate a high-precision mesoscale Mesh model;

S34, detailed investigation of characteristics: Based on the mesoscale real 3D landslide model, performing a millimeter level extraction and analysis for the development characteristics, disaster mechanism, and disaster-causing factors of landslide disaster.

Figure 10:
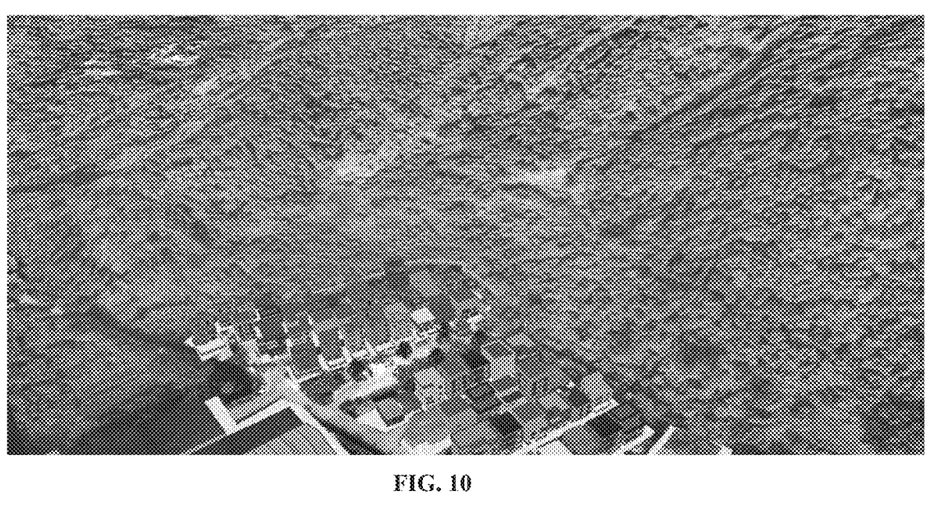
FIG. 10 is a mesoscale real 3D landslide effect diagram in the embodiment of the invention.

FIG. 10 is a mesoscale real 3D landslide effect diagram in the embodiment of the invention.

Figure 5:
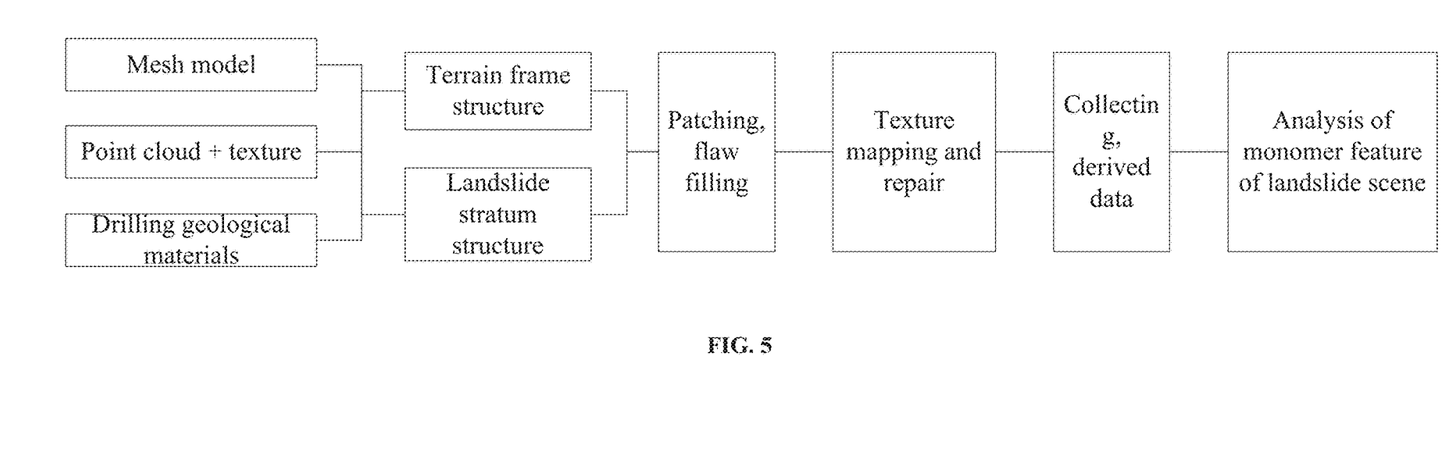
FIG. 5 is a flow chart of small-scale scene modeling and analysis in the embodiment of the invention.

FIG. 5 is a flow chart of small-scale scene modeling and analysis in the embodiment of the invention. S4, small-scale scene modeling and analysis: The monomer subdivision is performed for the real 3D model, and the component-level reconstruction of the ground-related feature frame structure and the underground landslide stratum structure are completed, high-precision detailed features and parameters are analyzed and extracted.

S41, data analysis: The landslide data such as 3D Mesh model, laser point cloud, texture photos, and borehole geological data are integrated, the data benchmark are unified, and the landslide-related entity subdivision structure and rock and soil properties are analyzed.

S42, monomer reconstruction: The landslide subdivision model and the 3D stratum model are constructed respectively.

S43, model refinement: The reconstructed landslide structure and the 3D model of the geological body are improved through cutting, repairing, hole filling, and other methods.

S44, texture mapping: The texture of detail parts is improved and repaired, and the surface texture mapping of the model is completed.

S45, data derivation: The monomer complement of ground object entities and the topological hierarchy construction of geographic units are completed through the two-dimensional vector or other 3D data acquisition or derivation.

S46, monomer characteristics analysis: The 3D fine feature information of each monomer model in the landslide scene is extracted.

Figure 11:
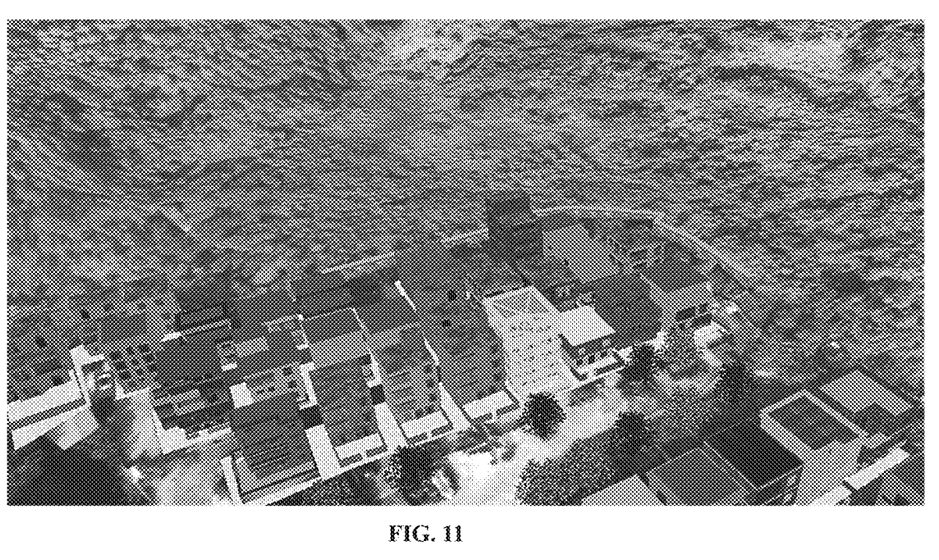
FIG. 11 is an effect diagram of a small-scale landslide component-level 3D model in the embodiment of the invention.
Figure 12:
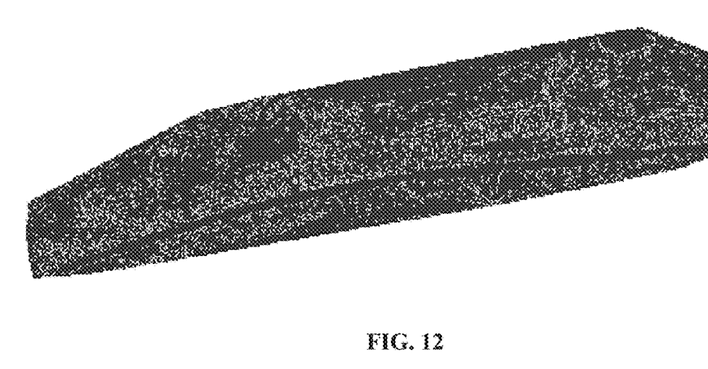
FIG. 12 is a schematic diagram of landslide characteristics in the embodiment of the invention.
Figure 13:
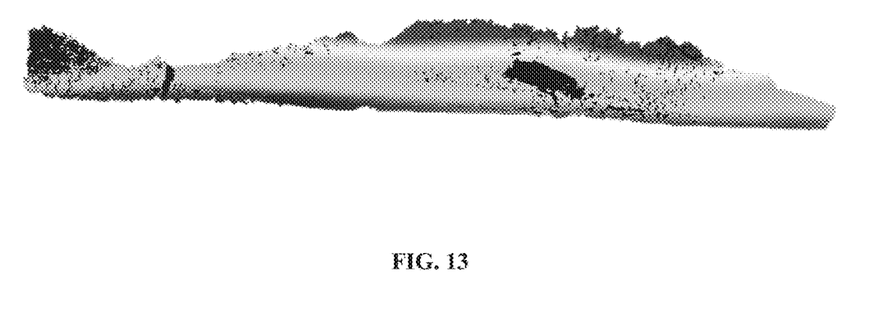
FIG. 13 is a 3D point cloud model of the landslide body in the embodiment of the invention.

FIG. 11 is an effect diagram of a small-scale landslide component-level 3D model in the embodiment of the invention. FIG. 12 is a schematic diagram of landslide characteristics in the embodiment of the invention. FIG. 13 is a 3D point cloud model of the landslide body in the embodiment of the invention.

Figure 6:
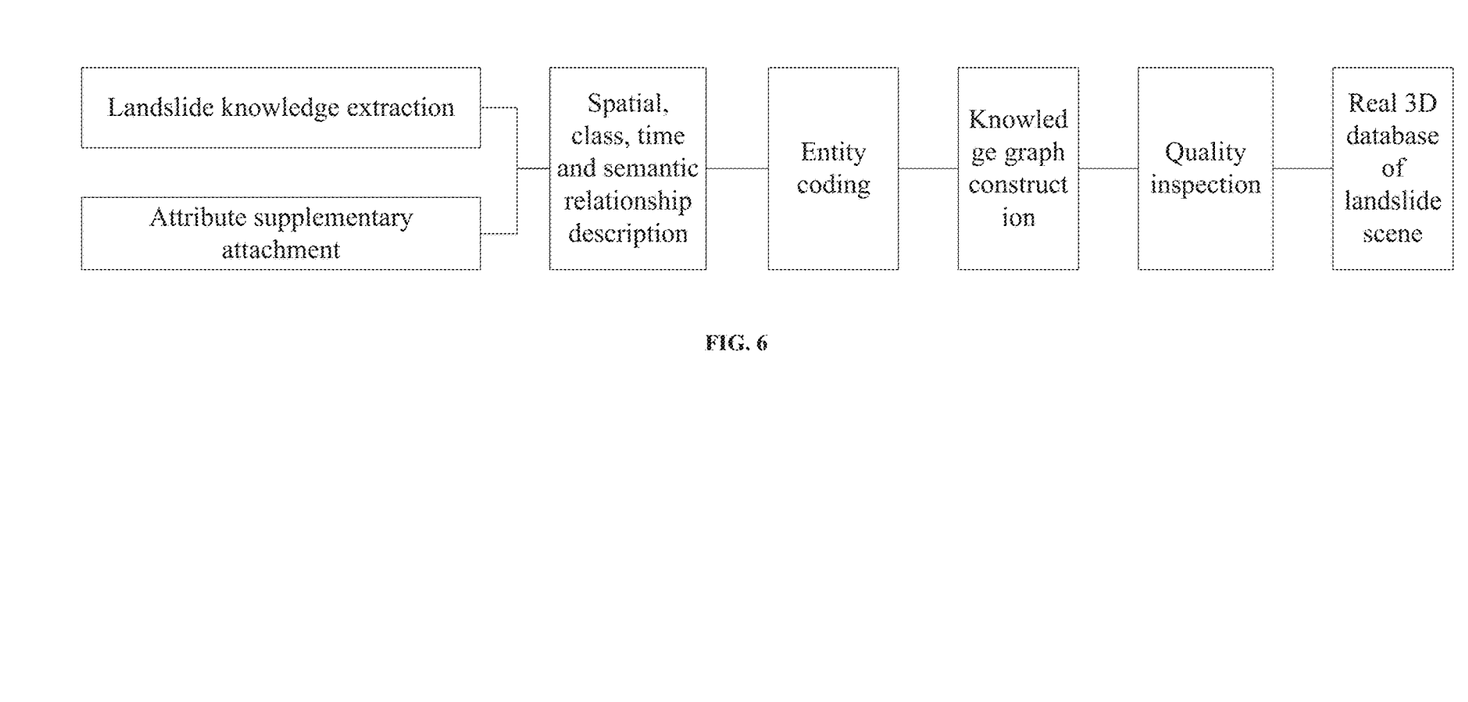
FIG. 6 is a flow chart of landslide knowledge association and entity database construction in the embodiment of the invention.

FIG. 6 is a flow chart of landslide knowledge association and entity database construction in the embodiment of the invention. S5, landslide knowledge association, and entity database construction: The knowledge ontology is extracted by integrating the real 3D landslide model, geological environment data, and historical disaster data, attributes are improved by means of supplement and connection, and the spatial, class, time and semantic relationships of multi-scale entities are analyzed; the entity coding and assignment are unified, and the knowledge map of landslide scene is constructed, after a standardized data quality inspection, integrating the data by requirements to establish a real 3D database of landslide scene.

Figure 7:
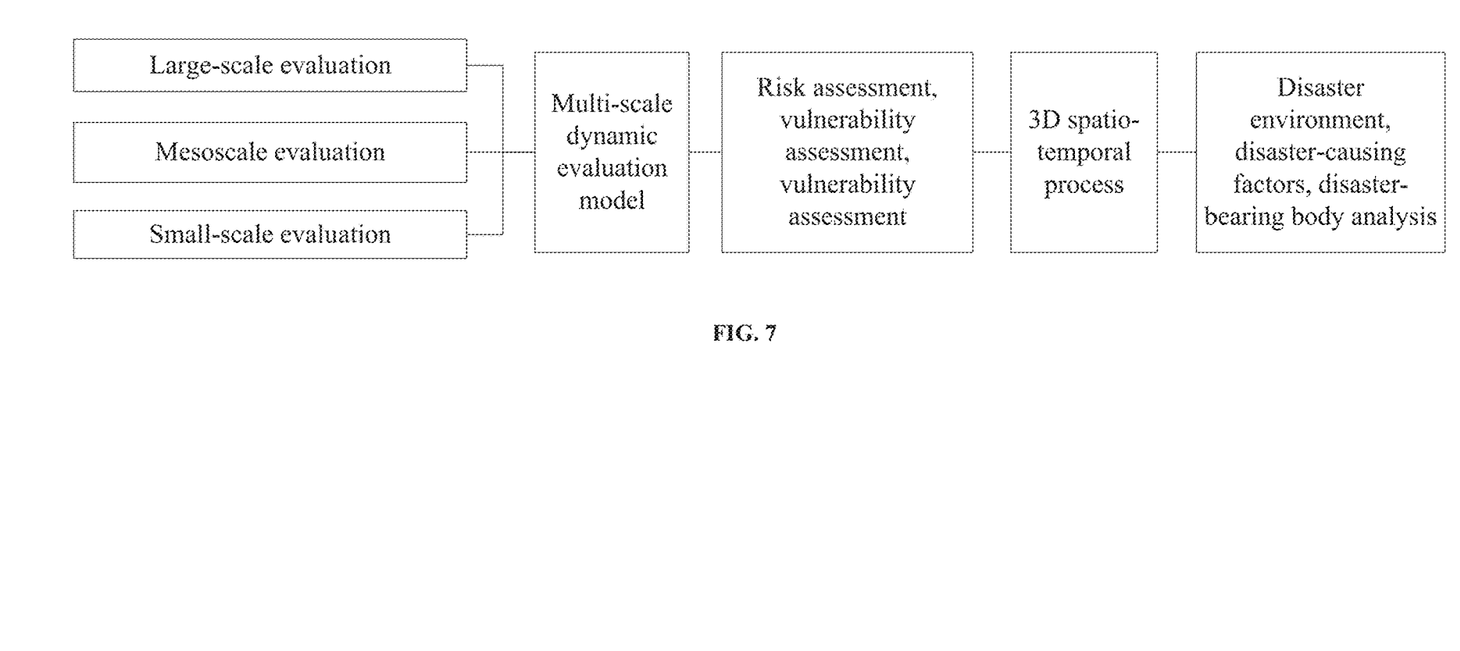
FIG. 7 is a flow chart of landslide risk multi-scale dynamic assessment in the embodiment of the invention.

FIG. 7 is a flow chart of landslide risk multi-scale dynamic assessment in the embodiment of the invention. S6, landslide risk multi-scale dynamic assessment: The multi-scale spatio-temporal dynamic assessment model of landslide risk in read 3D based on the full-factor real 3D landslide scene database is constructed, the risk assessment, the susceptibility assessment and the vulnerability assessment are carried out from different scales of large, medium and small, combined with the 3D spatio-temporal process of landslide evolution, the disaster-inducing environment, disaster-causing factors and disaster-bearing bodies of the landslide are analyzed dynamically, and the key indicators of emergency monitoring of landslide geological disasters and their critical thresholds of the disaster-causing factors such as rock and soil, rainfall and deformation under a coupling action are extracted.

Figure 8:
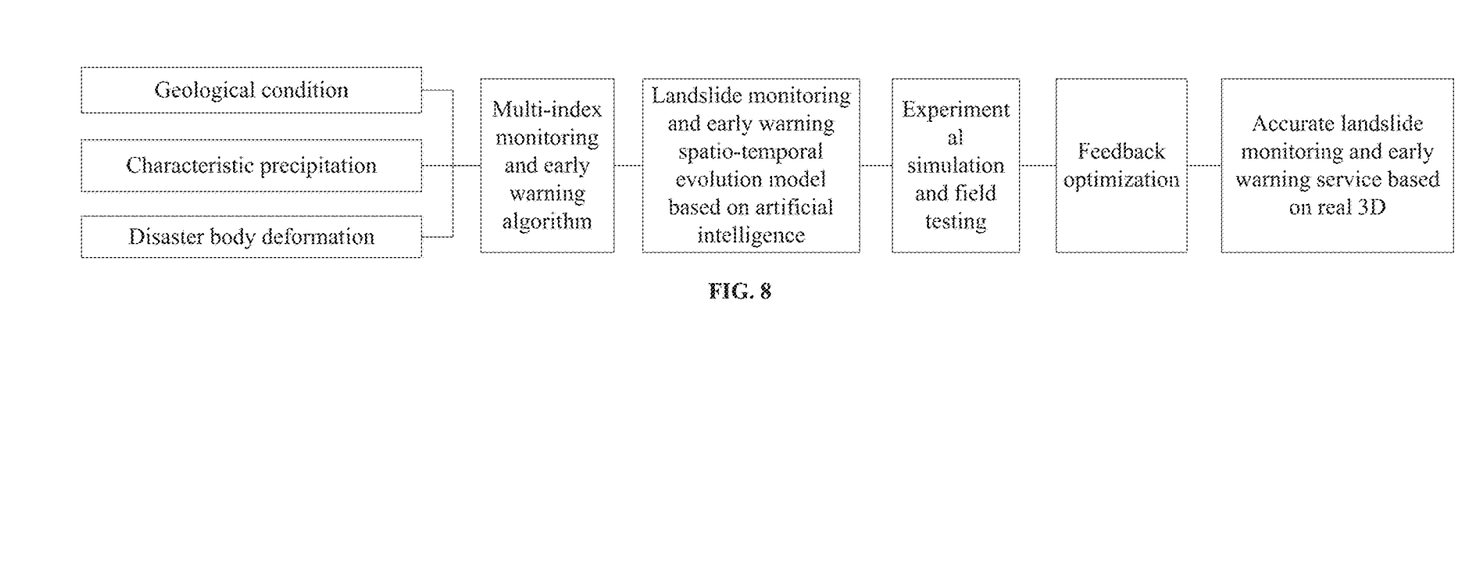
FIG. 8 is a flow chart of landslide multi-indicator monitoring and early warning in the embodiment of the invention.

FIG. 8 is a flow chart of landslide multi-indicator monitoring and early warning in the embodiment of the invention. S7, landslide multi-indicator monitoring and early warning: The multi-indicator landslide disaster monitoring and early warning algorithm with priority to basic geological conditions, priority to characteristic rainfall, and priority to disaster deformation are constructed, and the knowledge-guided landslide monitoring and early warning spatio-temporal evolution model based on artificial intelligence is established, the algorithm after experimental simulation and field testing are trained repeatedly and optimized, and the early warning mechanism is improved, the timely and accurate real-time 3D landslide risk monitoring and early warning services are provided.

The landslide hazard monitoring and early warning system based on 3D in this invention,
comprising the multi-source data integration management module: the landslide-related basic geographic information data, satellite remote sensing images, UAV images, laser point cloud data, geological environment data, historical geological disaster data, disaster professional monitoring data, monitoring video data, manual inspection report data and other data and other multi-source data are collected for the integrated fusion processing.

The large-scale scene modeling and analysis: The satellite remote sensing data or UAV image data combined with geological environment census data is used to carry out the global scope of landslide census, and the rapid reconstruction of large-scale landslide scenes with the resolution accuracy from meters to centimeters is completed, the relevant characteristics and parameters of large-scale scene landslide are analyzed and extracted.

The mesoscale scene modeling and analysis module: the UAV close-range image and laser point cloud data are used to carry out the detailed investigation of the disaster, and the real 3D modeling of the mesoscale landslide is completed (resolution accuracy reaches a meter level), and the characteristics and parameters of the landslide body are analyzed and extracted.

The small-scale scene modeling and analysis module: The monomer subdivision is performed in the real 3D model, the component-level reconstruction of the ground-related feature frame structure and the underground landslide stratum structure is completed, and the high-precision detailed features and parameters are extracted.

The landslide knowledge association and entity database construction module: The knowledge ontology is extracted by integrating the real 3D landslide model, geological environment data, and historical disaster data, attributes are improved by means of supplement and connection, and the spatial, class, time and semantic relationships of multi-scale entities are analyzed; the entity coding and assignment are unified, and the knowledge map of landslide scene is constructed, after the standardized data quality inspection, the data are integrated by requirements to establish the real 3D database of landslide scene.

The landslide risk multi-scale dynamic assessment module: based on the full-factor real 3D landslide scene database, the risk assessment, the susceptibility assessment, and the vulnerability assessment from different scales of large, medium, and small are realized, combined with the 3D spatio-temporal process of landslide evolution, the disaster-inducing environment, disaster-causing factors and disaster-bearing bodies of the landslide are dynamically analyzed, and key indicators of emergency monitoring of landslide geological disasters and their critical thresholds of the disaster-causing factors such as rock and soil, rainfall and deformation under a coupling action are extracted.

The landslide multi-indicator monitoring and early warning module: the multi-indicator landslide disaster monitoring and early warning algorithm with priority to basic geological conditions, priority to characteristic rainfall, and priority to disaster deformation etc. are realized, and the landslide monitoring and early warning spatio-temporal evolution model based on artificial intelligence are established, the algorithm is repeated trained and optimized after experimental simulation and field testing and the early warning mechanism is improved, and the system can timely and accurately detect landslide safety hazards and carry out early warnings; The multi-indicator landslide disaster monitoring and early warning algorithm and model include: 1) indicator factor and spatio-temporal correlation data preprocessing; 2) indicator factor screening and sample training are carried out according to basic geological conditions, characteristic rainfall and disaster deformation; 3) the deep learning model of full convolutional network and long-term and short-term memory network is constructed, and the attention mechanism is introduced to strengthen the constraints of the historical landslide knowledge data, so as to increase the generalization ability of the model and the reliability of early warning results; 4) on the basis of the training samples, new experimental simulation data and field landslide disaster data are continuously added to further iteratively optimize the model parameters and gradually correct the early warning results.

where the coding layer of the fully convolutional network is the convolutional neural network, and the most important part of the convolutional neural network is the convolutional layer. The basic neural unit of the general neural network is a linear operation, and the convolution neural network is to change the linear operation into a convolution operation, the convolution operation is calculated by the convolution kernel and the input feature map, and the calculation result is output to the next layer of the network through the nonlinear mapping of the activation function. The calculation method is as follows:

$$X_j^l = f\left(\sum_{i \in M_j} X_j^{l-1} \cdot k_{ij}^l + b_j^l\right)$$

In the formula: l is the number of layers, k is a convolution kernel, b is a bias term, M is a feature map of the upper input, X is a feature map of the current layer that needs convolution operation, f is a nonlinear activation function, i is a pixel row number, j is a pixel column number, and the values of i and j belong to [1, n].

The real 3D scene display module: the high-tech computer rendering engine is used to realize the 2D and 3D integrated visualization display of landslide disasters, comprising the basic operation of view, layer management, measurement, plotting, roaming, recording tools, etc.

The system management and maintenance module: the system configuration, user management, rights management, database parameters, and other functions are included.

Therefore, the invention adopts the above-mentioned landslide hazard monitoring and early warning method and system based on real 3D, which can realize different scale data acquisition and real 3D modeling of landslide disasters, and can establish a more refined real 3D scene to truly express landslide entities from various aspects.

Finally, it should be explained that the above embodiment is only used to explain the technical solution of the invention rather than restrict it, although the invention is described in detail with reference to the better embodiment, ordinary technical personnel in this field should understand that they can still modify or replace the technical solution of the invention, and these modifications or equivalent substitutions cannot make the modified technical solution out of the spirit and scope of the technical solution of the invention.

What is claimed is:

1. A landslide hazard monitoring and early warning method based on a real 3D, comprising the steps of:
   collecting landslide-related data for an integrated fusion processing, wherein:
      collecting landslide-related data comprises of collecting multi-source data comprising of basic geographic information data, satellite remote sensing images, unmanned aerial vehicle (UAV) images, laser point cloud data, geological environment data, historical disaster data, disaster professional monitoring data, video surveillance data, and manual inspection report data related to landslides for the integrated fusion processing; and
      performing digitization and format conversion for heterogeneous data, unifying data benchmarks and coordinate projections, completing an image splicing and a data registration, realizing a synchronous matching of static geospatial data and dynamic internet of things perception data, and constructing a real 3D landslide data map;
   performing large-scale scene modeling and analysis using satellite remote sensing data or UAV image data combined with geological environment census data to carry out a global scope of landslide census, and completing a rapid reconstruction of large-scale landslide scene with a resolution accuracy from meters to centimeters, analyzing and extracting relevant characteristics and parameters of large-scale scene landslide, wherein performing large-scale scene modeling and analysis further comprises the steps of:
      selecting high-resolution satellite images and drone images with high imaging quality, no cloud influence, and consistent hues, performing image preprocessing steps comprising of cloud removal, ensuring uniform light and uniform color, distortion correction, and mosaic enhancement;
      extracting robust feature points from stereo image pairs or multi-view images, and establishing a correspondence between corresponding feature points;
      identifying an image content with the same or similar structure in two or more images and establishing an accurate mapping relationship;
      carrying out an aerial triangulation by using internal and external orientation elements and POS information of each image, and taking homonymous points between the images as connection points to construct a self-calibration regional network adjustment error equation, so as to obtain accurate internal and external orientation elements and 3D coordinates of the connection points;
      performing a dense matching of homonymous image points of each pixel by using an accurate relative position relationship between images, and performing a front intersection to obtain a 3D point cloud on a surface of a ground object;
      constructing a triangulation network (TIN) to obtain a continuous triangulation surface model based on the 3D point cloud of dense surface, wherein the triangulation surface model is a Mesh white model;
      performing an automatic texture mapping for the white model according to a geometric relationship between an object side and an image side;
      forming a set of continuous real scene 3D models of global large-scale; and
      using a large-scale real 3D model to delineate a range of meter-level and centimeter-level disasters, and a general census of characteristics of surrounding topography, vegetation, ground objects, and disaster-inducing environment;

performing mesoscale scene modeling, and analysis using a UAV close-range image and laser point cloud data to carry out a detailed investigation of a disaster, and completing a real 3D modeling of a mesoscale landslide, and analyzing and extracting characteristics and parameters of a landslide body, wherein performing mesoscale scene modeling, and analysis further comprises the steps of:

using a UAV close photogrammetry technology for potential disaster areas to collect multi-angle millimeter-level spatial resolution close-range images for disasters, generating a dense point cloud after an aerial triangulation calculation and dense matching, under complex conditions, collecting millimeter-level point cloud data by a high-precision 3D laser scanner, separating ground points and non-ground points under vegetation coverage after point cloud denoising and filtering;

implementing a UAV image dense point cloud and a preprocessed 3D laser point cloud for registration, evaluation, and fusion;

reconstructing the complete point cloud after fusion by triangulation, carrying out a texture mapping and a model mapping to generate a high-precision mesoscale Mesh model; and performing, based on a mesoscale real 3D landslide model, a millimeter level extraction and analysis for development characteristics, disaster mechanism, and disaster-causing factors of landslide disaster;

performing small-scale scene modeling and analysis by performing a monomer subdivision for the real 3D model, and completing a component-level reconstruction of a ground-related feature frame structure and an underground landslide stratum structure, analyzing and extracting high-precision detailed features and parameters, wherein small-scale scene modeling and analysis further comprises the steps of:

integrating landslide data comprising of 3D Mesh model, laser point cloud, texture photos, and borehole geological data, unifying data benchmark, and analyzing landslide-related entity subdivision structure and rock and soil properties;

constructing a landslide subdivision model and a 3D stratum model respectively;

improving a reconstructed landslide structure and a 3D model of a geological body through cutting, repairing, and hole filling;

improving and repairing a texture of detail parts, completing a surface texture mapping of the model;

completing a monomer complement of ground object entities and a topological hierarchy construction of geographic units through a two-dimensional vector or other 3D data acquisition or derivation; and extracting 3D fine feature information of each monomer model in the landslide scene;

extracting landslide knowledge association and entity database construction;

constructing landslide risk multi-scale dynamic assessment; and constructing landslide multi-indicator monitoring and early warning algorithm.

2. The landslide hazard monitoring and early warning method based on the real 3D according to claim 1, wherein extracting landslide knowledge association and entity database construction further comprises the steps of:

extracting a knowledge ontology by integrating the real 3D landslide model, geological environment data, and historical disaster data, attributes are improved by means of supplement and connection, and analyzing spatial, class, time and semantic relationships of multi-scale entities; and unifying an entity coding and assignment, and constructing a knowledge map of landslide scene, after a standardized data quality inspection, integrating the data by requirements to establish a real 3D database of landslide scene.

3. The landslide hazard monitoring and early warning method based on the real 3D according to claim 2, wherein constructing landslide risk multi-scale dynamic assessment further comprises the steps of:

constructing a multi-scale spatio-temporal dynamic assessment model of landslide risk in real 3D based on a full-factor real 3D landslide scene database, carrying out a risk assessment, a susceptibility assessment and a vulnerability assessment from different scales of large, medium and small, combined with a 3D spatio-temporal process of landslide evolution, dynamically analyzing a disaster-inducing environment, disaster-causing factors and disaster-bearing bodies of the landslide, and extracting key indicators of emergency monitoring of landslide geological disasters and their critical thresholds of the disaster-causing factors.

4. The landslide hazard monitoring and early warning method based on the real 3D according to claim 3, wherein, constructing landslide multi-indicator monitoring and early warning algorithm further comprises the steps of:

constructing a multi-indicator landslide disaster monitoring and early warning algorithm with priority to basic geological conditions, priority to characteristic rainfall, and priority to disaster deformation, and establishing a knowledge-guided landslide monitoring and early warning spatio-temporal evolution model based on artificial intelligence, repeatedly training and optimizing the algorithm after experimental simulation and field testing and improving an early warning mechanism, providing a timely and accurate real-time 3D landslide risk monitoring and early warning services.

* * * * *